Dec. 4, 1951 L. H. E. FOX 2,577,187
METHOD OF FORMING BEARINGS
Filed Aug. 12, 1946

INVENTOR.
LAWRENCE H. E. FOX
BY William R. Lane
ATTORNEY

Patented Dec. 4, 1951

2,577,187

UNITED STATES PATENT OFFICE 2,577,187

METHOD OF FORMING BEARINGS

Lawrence H. E. Fox, Inglewood, Calif., assignor to North American Aviation, Inc.

Application August 12, 1946, Serial No. 689,984

1 Claim. (Cl. 29—149.5)

This invention relates to brazing techniques and more particularly to the utilization of a matrix and a brazing material to not only form objects but also to fasten such objects to other objects in a brazing operation.

This invention more particularly relates to structural joints, and to a bearing which will withstand without damage temperatures and conditions accompanying a brazing operation.

It is an object of this invention to apply the new and novel brazing technique disclosed herein to the manufacture of a bearing which is capable of withstanding high temperatures and yet has desired friction and compression characteristics.

It is a further object of this invention to provide a bearing formed of a porous matrix of suitable material in combination with brazable bearing material.

It is still a further object of this invention to provide bearings and structural joints which may be brazed in place by utilizing in the brazing operation material constituting a part of the bearing or joint.

Other objects of invention will become apparent from the following drawings and written description in which.

Figure 1:
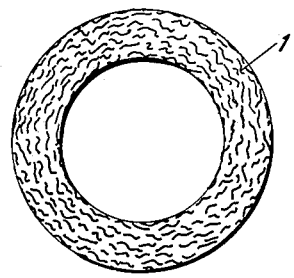
Fig. 1 is a top plan view of a shaped matrix.
Figure 3:
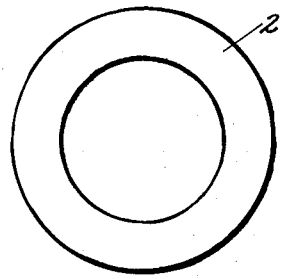
Fig. 3 is a top plan view of a rough bearing comprising the matrix of Fig. 1 impregnated with brazable material.
Figure 2:
Fig. 2 is a side view of Fig. 1, partly in elevation and partly in section.
Figure 4:
Fig. 4 is a side view, partly in elevation and partly in section, of the bearing illustrated in Fig. 3.

Referring to the drawings, Figs. 1 through 5 illustrate the application of my invention to a bearing and method of making the same. In Fig. 1 there is illustrated a matrix 1 of suitable material, such as steel wool, pre-formed into a hollow cylindrical shape by any suitable means, such as dies or the like. This matrix is then associated with a brazable material, such as copper, either by the spraying of copper on the matrix by, for instance, a metalizing gun, or placing the matrix in, say, a furnace having a controlled atmosphere—to prevent oxidization of the matrix—and placing copper in sufficiently close proximity to the matrix so that upon melting of the copper the same will intersperse itself through the matrix, preferably by capillary action. It has been found that by placing the matrix in a crucible, for instance, containing a small amount of copper, and placing the resulting assembly in a furnace having a controlled atmosphere and a temperature higher than the melting point of the copper, the copper will intersperse itself throughout the matrix by capillary action. Satisfactory interspersion of copper may be obtained by placing copper chips on the matrix or a coil of copper wire inside the matrix prior to placing the matrix in the furnace. The density of the bearing may be controlled by the packing of the matrix material. It has been found that a relatively heavy and dense bearing may be obtained from a closely packed matrix, while a loosely packed matrix results in a relatively porous bearing. When steel wool is used as matrix material it may be desired to anneal the same prior to associating copper or other bearing material therewith so as to avoid hardening of the matrix during the brazing operation. The appearance of copper at the top and sides of the matrix is an indication of complete interspersion of copper throughout the matrix. The rough bearing thus formed is illustrated at 2 in Figs. 3 and 4. This bearing may then be placed within a hollow cylindrical member such as 3 in Fig. 5 and the resulting assembly subjected to a brazing operation. Subsequently it may be desired to machine the interior of the bearing 2 so as to receive a shaft 4 mounted for reciprocatory or rotative movement. The bearing thus formed will not be affected by any subsequent heat treatment and will not melt or be otherwise affected during the brazing operation. The resulting assembly provides not only an effective bond between the bearing and the member to which it is attached but also a very efficient method of effectively dissipating the heat from the bearing, this heat traveling from the bearing through the bond into the bearing carrying member to be dissipated therefrom.

Figure 5:
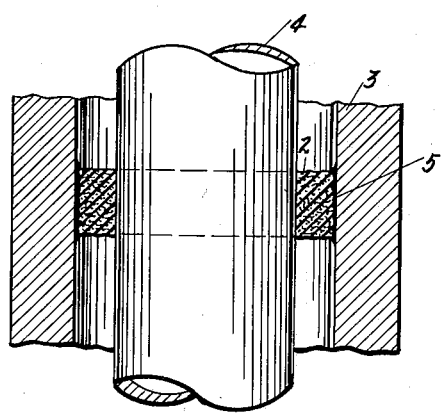
Fig. 5 is a cross-sectional view with parts in elevation of an application of the bearing illustrated in Fig. 3.

When it is desired to form a bearing as a part of a brazing operation in which other parts of the structure are being brazed, the matrix may be associated with the part to which it is to be attached, such as 3 in Fig. 5, the matrix either being previously coated with brazable material by spraying or otherwise, or the brazable material initially associated with the matrix by placing chips or a coil of such material on or adjacent to the matrix. During the brazing operation the brazable material will be melted and become associated with the matrix through capillary action or otherwise, and not only become interspersed throughout the matrix but also at the same time result in the matrix, with the brazable material contained therein, being fastened or brazed to a member, such as 3, the bond being indicated at 5 in Fig. 5.

Figure 6:
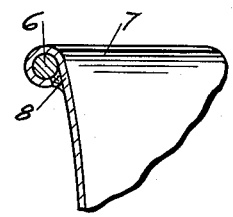
Fig. 6 is a perspective view, partly in section, of another application of the invention.

Referring to Fig. 6 there is illustrated a further example of the brazing technique constituting my invention. The technique is applied in this application of the invention to obtain a smooth joint in the instance of a reinforcing member 6 being applied to the end of a sheet material 7. Matrix material 8 is forced into the space formed as the result of the bent-over portion of sheet material 7 failing to engage the main body of the sheet material. Brazable material is then associated with the matrix material either by spraying or by associating chips of the material with the same, and the resulting assembly subjected to a brazing operation. Surplus material may be removed from the resulting assembly by any suitable means.

Figure 7:
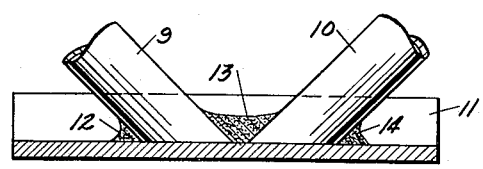
Fig. 7 is an elevational view, partly in section, of a joint formed in accordance with the invention.

In Fig. 7 there is illustrated another application of my invention. In this illustration, tube members 9 and 10 are fastened to a structural member 11 which may be in the form of a channel or an angle or other suitable shape. Members 9 and 10 may be preliminarily held in association with member 11 by tack welds or the like. In this embodiment of the invention, matrix material is placed at 12, 13, and 14, brazable material is associated therewith, and the resulting assembly subjected to a brazing operation during which the brazable material becomes interspersed in the matrix material and results not only in fastening members 9 and 10 to member 11, but also provides a reinforced area at the junction of the several members.

While I have illustrated steel wool and copper as the matrix and brazing materials, respectively, and have shown the brazing technique constituting the subject matter of my invention applied to a bearing and to reinforcing and fastening of members together, it is to be understood that the foregoing is by way of illustration and example only, and that the spirit and scope of this invention is to be limited only by the terms of the appended claim.

I claim:

A method of forming a journal bearing and simultaneously attaching it to an object comprising the steps of forming and predeterminately compacting into suitable shape a matrix of steel wool, subjecting the matrix to an annealing action, retaining the matrix in predetermined relation with respect to said object, placing brazable material adjacent said matrix, subjecting the resulting assembly to controlled atmosphere comprising a temperature above the melting point of the brazable material but below the melting point of the matrix for only a sufficient period of time to allow the brazable material to intersperse itself by capillary action throughout the matrix, and thereupon cooling the assembly to thereby result in a bearing and an attachment between the bearing and the object.

LAWRENCE H. E. FOX.

REFERENCES CITED

The following references are of record in the file of this patent:

UNITED STATES PATENTS

| Number | Name | Date |
| --- | --- | --- |
| 629,395 | Sargent | July 25, 1899 |
| 840,165 | Simpson | Jan. 1, 1907 |
| 1,342,801 | Gebauer | June 8, 1920 |
| 1,424,505 | Martin | Aug. 1, 1922 |
| 1,620,530 | Field | Mar. 8, 1927 |
| 2,060,959 | Terry | Nov. 17, 1936 |
| 2,061,850 | Roberts | Nov. 24, 1936 |
| 2,100,159 | Curstadt | Nov. 23, 1937 |
| 2,232,176 | Guthrie | Feb. 18, 1941 |
| 2,332,726 | Joyce | Oct. 26, 1943 |
| 2,337,322 | Gascoigne | Dec. 21, 1943 |
| 2,357,578 | Brownback | Sept. 5, 1944 |
| 2,369,537 | Crawford | Feb. 13, 1945 |
| 2,401,483 | Hensel | June 4, 1946 |
| 2,464,591 | Larsen | Mar. 15, 1949 |